Sept. 10, 1935.  P. C. BUTLER  2,013,742
MOTOR VEHICLE CHASSIS WASHER
Filed Nov. 1, 1934  5 Sheets-Sheet 1

Inventor
Park C. Butler

By *Clarence A. O'Brien*
Attorney

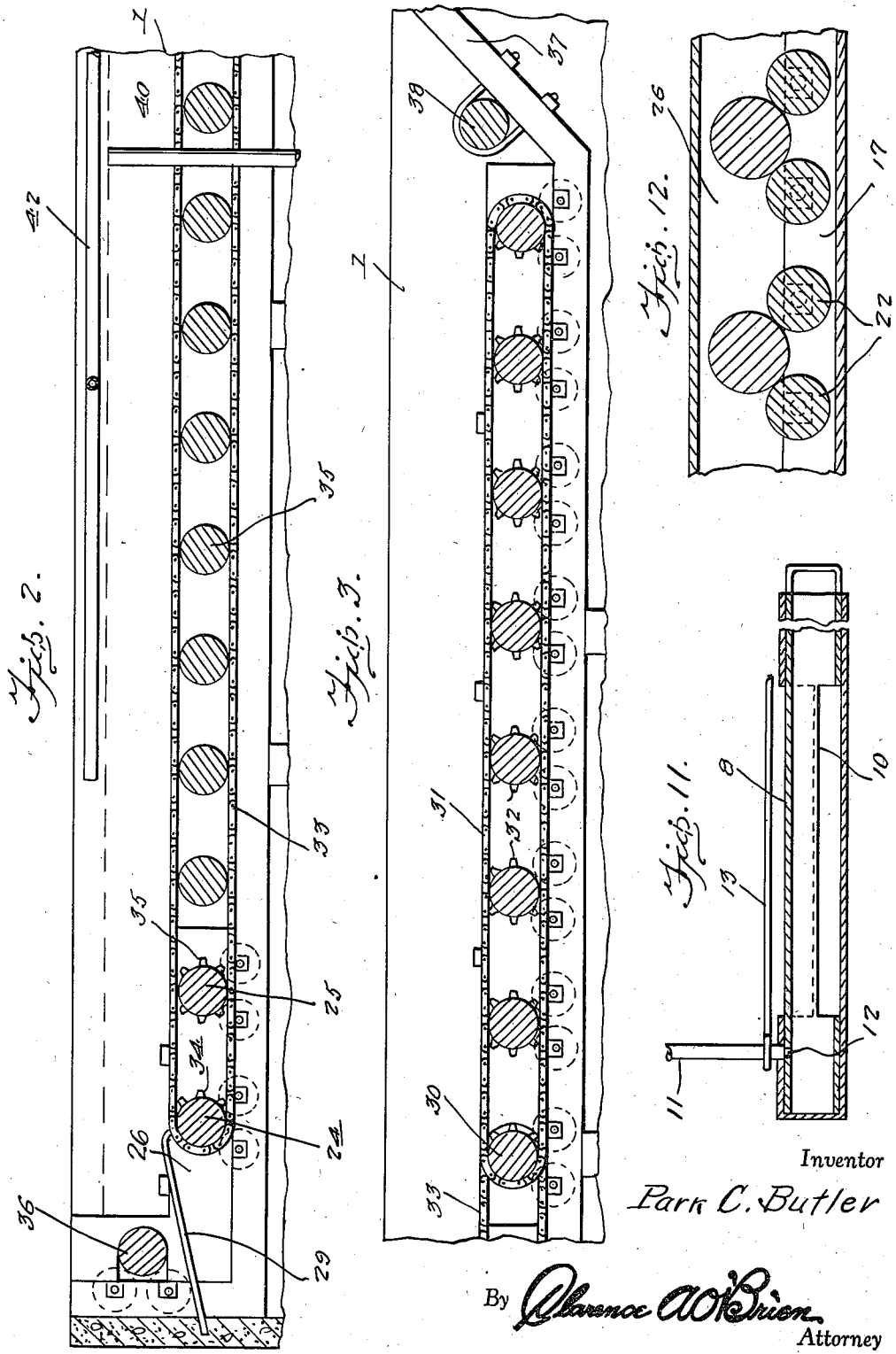

Sept. 10, 1935.                P. C. BUTLER                2,013,742
                        MOTOR VEHICLE CHASSIS WASHER
                          Filed Nov. 1, 1934         5 Sheets-Sheet 3
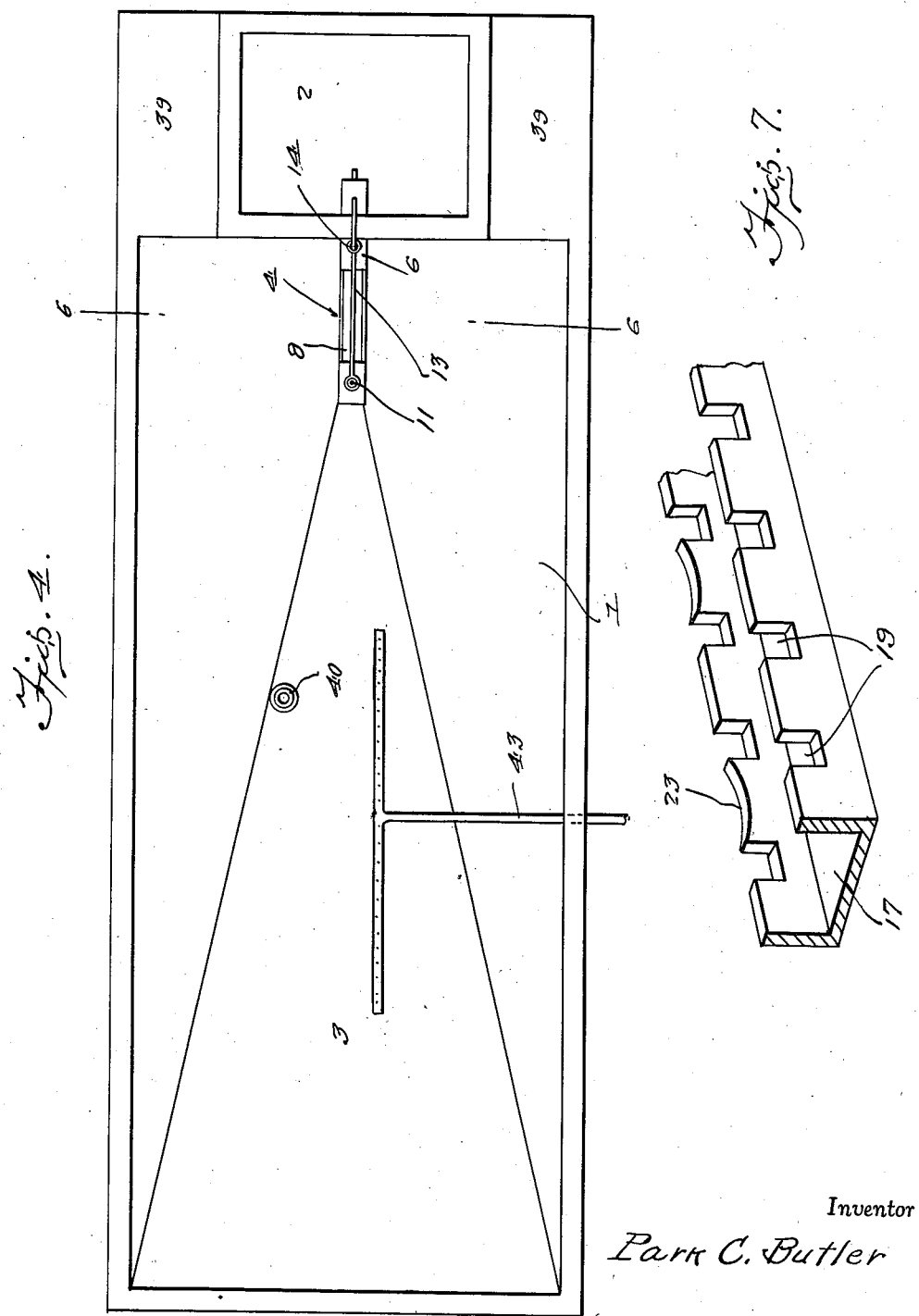
Inventor
*Park C. Butler*
By *Clarence A. O'Brien*
                              Attorney Sept. 10, 1935.   P. C. BUTLER   2,013,742
MOTOR VEHICLE CHASSIS WASHER
Filed Nov. 1, 1934   5 Sheets-Sheet 4
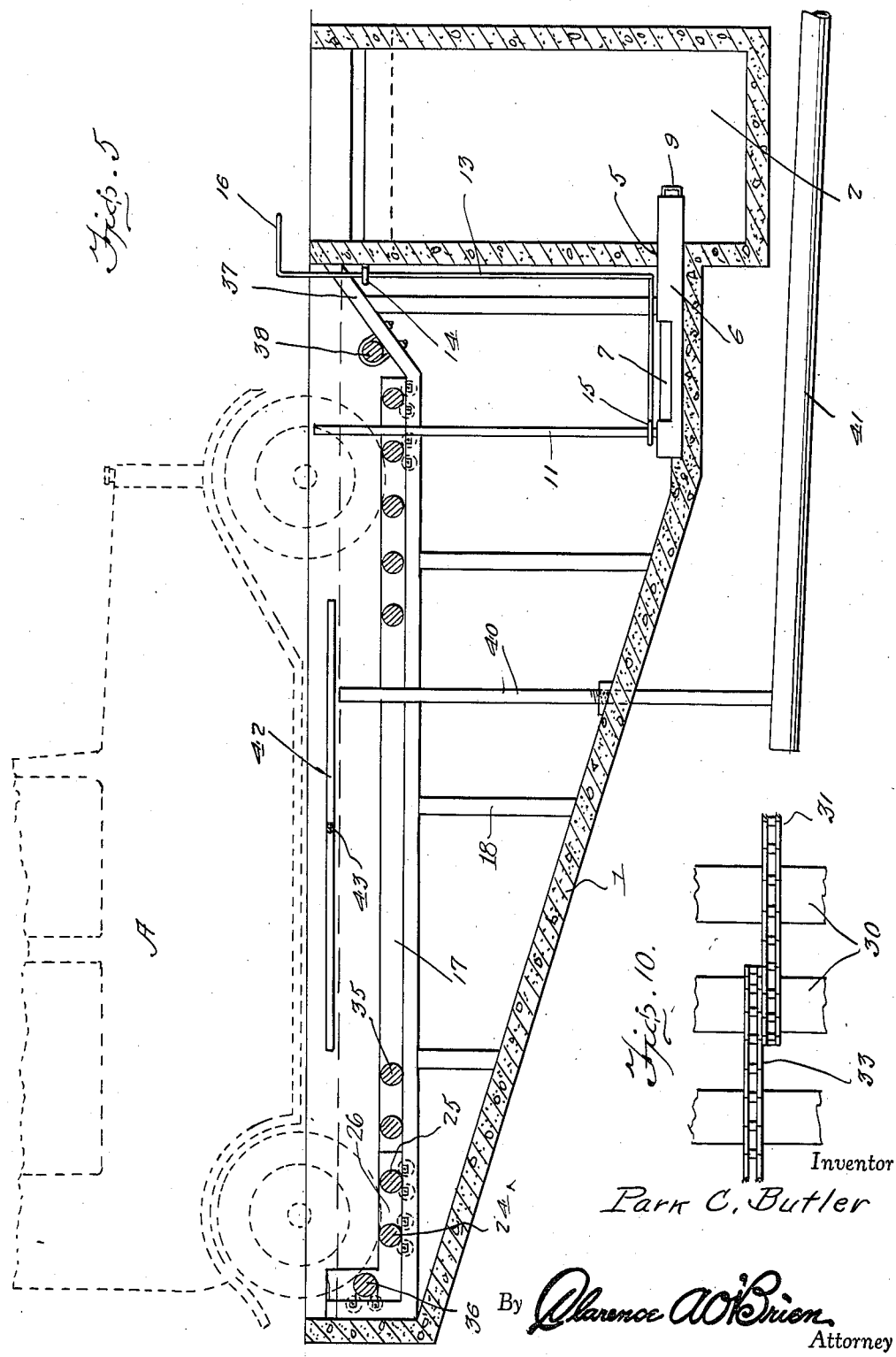
Inventor
*Park C. Butler*
By *Clarence A. O'Brien*
Attorney Sept. 10, 1935.   P. C. BUTLER   2,013,742
MOTOR VEHICLE CHASSIS WASHER
Filed Nov. 1, 1934   5 Sheets-Sheet 5
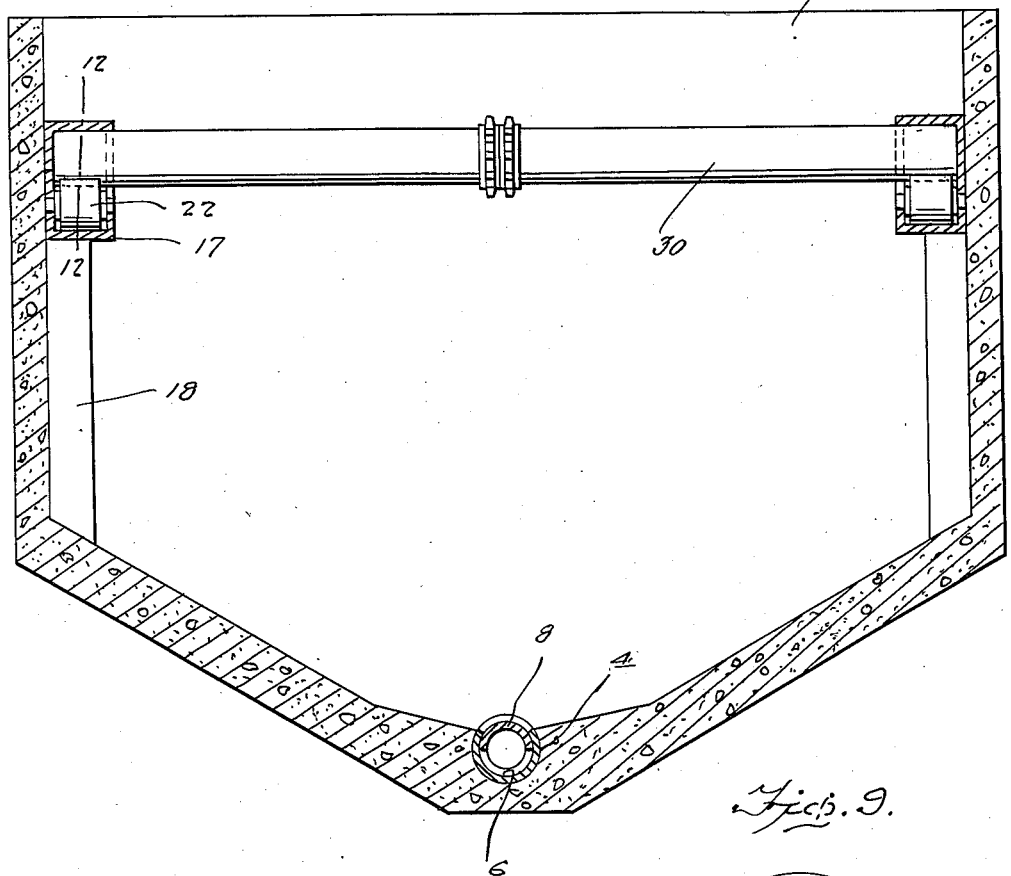
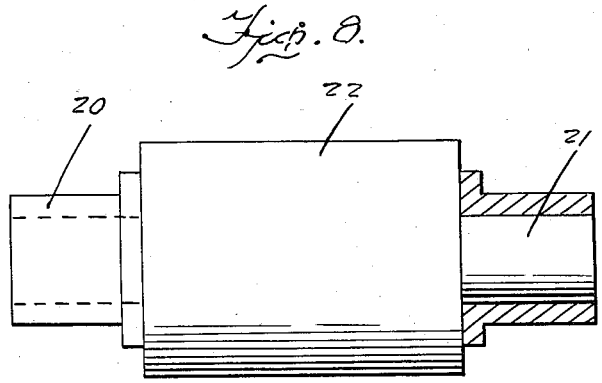
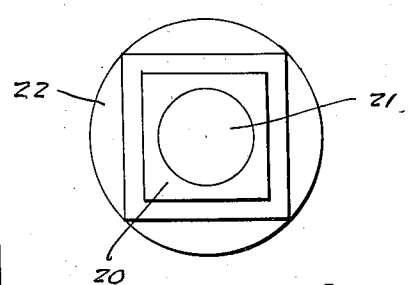
Inventor
Park C. Butler
By Clarence A. O'Brien
Attorney Patented Sept. 10, 1935

2,013,742

UNITED STATES PATENT OFFICE 2,013,742

MOTOR VEHICLE CHASSIS WASHER

Park C. Butler, Moundville, Mo.

Application November 1, 1934, Serial No. 751,078

1 Claim. (Cl. 141—1)

This invention relates to a device for washing chassis of automobiles and the like, the general object of the invention being to provide means whereby the wheels of a motor vehicle may be utilized for throwing water against parts of the chassis and the fenders for washing the same with spray means for washing other parts of the chassis.

This invention also consists in certain other features of construction and in the combination and arrangement of several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 2 is a longitudinal vertical sectional view through said front part.

Fig. 3 is a longitudinal vertical sectional view through the rear part of the apparatus.

Fig. 4 is a top plan view of the pit with the rack removed.

Fig. 5 is a vertical longitudinal sectional view through the entire device showing an automobile in dotted lines with its wheels engaging some of the rollers.

Fig. 6 is a section on line 6—6 of Fig. 4 but showing part of the rack.

Fig. 7 is a fragmentary perspective view of one of the channel members.

Fig. 8 is a view partly in section of one of the short rollers and showing its bearing members.

Fig. 9 is an end view of Fig. 8.

Fig. 10 is a fragmentary top plan view showing the endless chains and how they engage sprockets on one of the rollers.

Fig. 11 is a longitudinal sectional view through the valve and showing some of the parts associated therewith.

Figure 12 is a fragmentary section on the line 12—12 of Figure 6.

Figure 1:
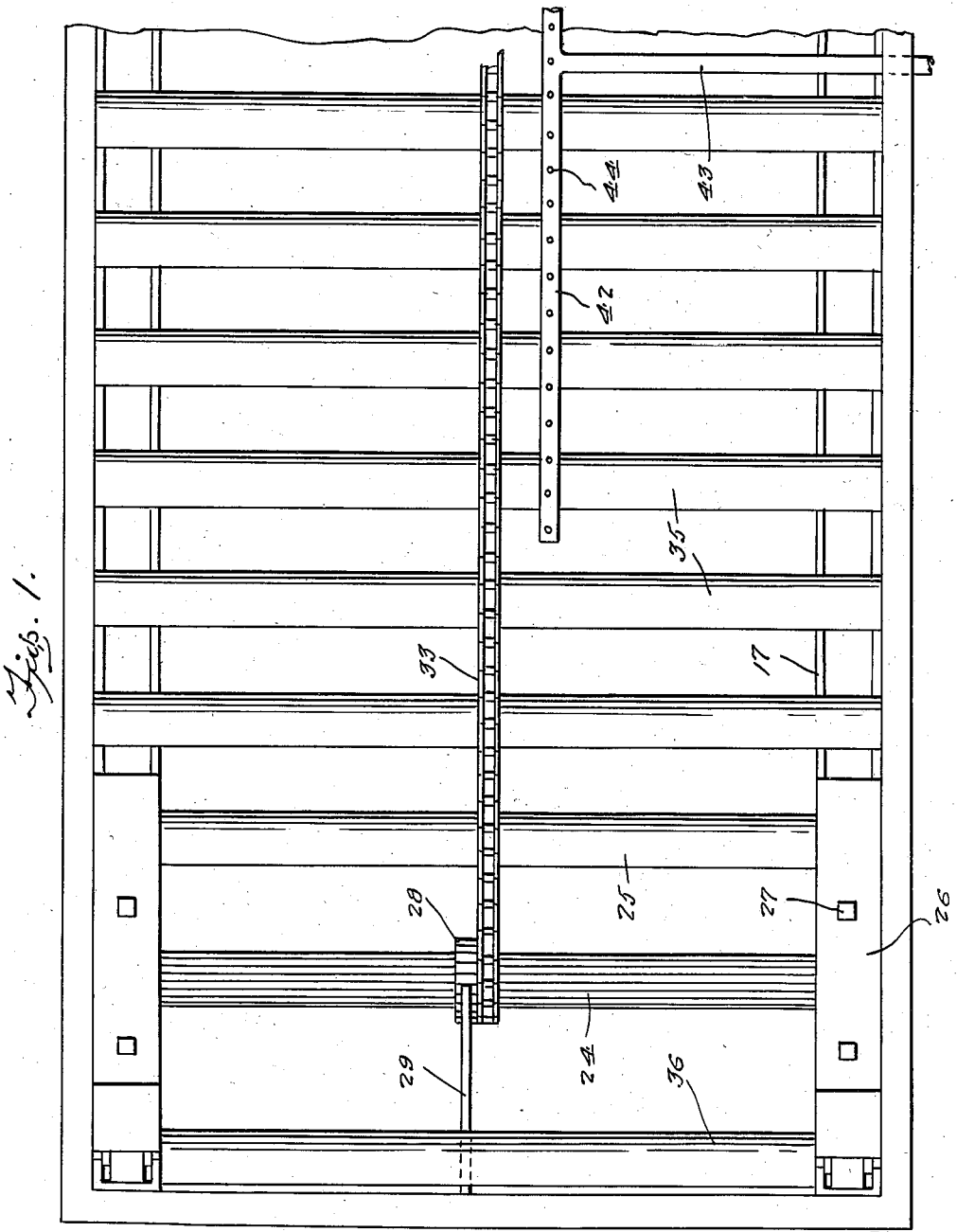
Fig. 1 is a top plan view of the front part of the invention with parts omitted.

In these drawings, the numeral 1 indicates a pit of substantially rectangular shape and the numeral 2 indicates a chamber located at the rear end of the pit, said pit and chamber being preferably formed of concrete. The bottom of the pit is formed with a part 3 which tapers from the front end to a point adjacent the rear end and which slopes downwardly from the front end, the small end of this part 3 leading to a channel 4 which has its rear end in communication with an opening 5 which leads into the chamber 2. An elongated valve casing 6 is located in the channel 4 and passes through the opening 5 into the chamber 2 and the top part of the front portion of the casing is cut away to provide an opening 7 for entrance of water from the pit. The side walls of the bottom part of the pit slope downwardly and inwardly to the part 3 and the rear portions of these walls slope to the opening 7 in the casing 6 so that substantially all the water in the pit can be drained therefrom by opening the elongated valve 8 which is rotatably arranged in the casing 6 and has a handle 9 at its rear end, the valve being of tubular construction and having a part cut away to provide the elongated opening 10 which will register with the opening 7 when the valve is turned to a certain position. A vertically arranged pipe 11 connects the front end of the casing with the atmosphere and the valve 8 has a hole 12 therein which will register with the pipe when the valve is in closed position so that the air entering the valve casing when the valve is closed will permit the water to run therefrom into the chamber 2.

An agitator rod 13 is supported by the eye 14 adjacent the top of the wall which separates the pit from the chamber and the lower end of the rod is bent and extended forwardly and has an eye 15 at its front end for encircling the pipe 11 so that by moving this rod by means of the handle 16 at its upper end, the mud collecting in the pit adjacent the valve can be agitated so that it will mix with the water and thus flow through the valve.

A channel member 17 is supported at the upper portion of each side wall of the pit by the posts 18 and the end parts of these channel members have notches 19 in their flanges for receiving the bearing members 20 for the trunnions 21 of the small rollers 22, these rollers being located between the flanges. Portions of the inside flanges of the channel members are formed with the arcuate-shaped recesses 23. Two pairs of rollers 22 at the front end of the device rotatably support the pair of long rollers 24—25, these long rollers having their ends resting on the pairs of rollers 22 as shown in Fig. 12 with portions of the ends of the long rollers passing through the recesses 23 which act to prevent slipping of the long rollers from off the short rollers. The long rollers are held in place by the inverted channel members 26 which are fastened to the channel members 17 by the bolts 27 as shown in Fig. 1.

The front roller 24 is corrugated longitudinally as shown in Fig. 1 and a ratchet wheel 28 is attached thereto and a dog 29 engages the ratchet wheel, these parts being so formed as to permit the roller 24 to rotate in a clockwise direction but prevent the roller 24 from rotating in an anti-clockwise direction.

A plurality of rotatably supported rollers 30 are arranged at the rear of the frame formed by the channel irons or members and these rollers 30 are supported in the same manner as are the rollers 24 and 25. These rollers 30 are connected together by the endless chain 31 passing over sprockets 32 attached to the rollers 30 and an endless chain 33 engages a sprocket 34 on the roller 24 and passes over a sprocket 35 on the roller 25 and this chain also passes over a sprocket on the forward roller 30 so that the rollers 30 are driven from the roller 24, as is the roller 25. Between the roller 25 and the forward roller 30 is located a plurality of spaced stationary rollers 35. A rotatable roller 36 is mounted in the upturned front end of the frame formed by the channel members and is located slightly over the horizontal plane of the other rollers and the rear end of said frame slopes upwardly and rearwardly as shown at 37 and one or more stationary rollers 38 are carried by this part of the frame. If desired or found necessary, the front part of the device can slope upwardly and forwardly, with the roller 36 on this part so that the automobile A shown in dotted lines in Fig. 5 will not drop upon the rollers 24 and 25 as it would have to do if the parts were arranged as shown in Fig. 5. After traveling up the inclined part 37, the wheels of the automobile will pass onto the parts 39, one of which is placed on each side of the chamber 2 and I prefer to make these parts slope downwardly to the chamber so that any water collecting on these parts 39 will flow into the chamber.

A vertically arranged discharge pipe 40 extends from a point adjacent the top of the pit downwardly through the pit to a drain pipe 41 and a horizontally arranged spray pipe 42 extends longitudinally in the upper portion of the pit above the water level thereof and is connected to a supply pipe 43. The perforations 44 in the pipe 42 are formed in the top thereof as shown in Fig. 1.

The motor vehicle to be washed is driven onto the rollers and as all the rollers are held stationary by the dog and ratchet, they will not rotate so that the car can be readily driven upon the rollers as shown in dotted lines in Fig. 1. The car is then placed in reverse which causes the corrugated roller to rotate and this movement is communicated to the roller 25 and the rollers 30 so that all four wheels of the vehicle will rotate and this rotary movement of the four wheels of the vehicle will throw water from the pit onto the fenders and chassis so that the wheels, fenders and portions of the chassis are cleaned. The rear wheels of the car engage the rotatable roller 36 so that the car is prevented from moving rearwardly. The water in the pit is maintained at a level below the drain or discharge pipe 40 but when the car is driven into the pit, the water level is raised to the top of the pipe 40 and thus any oil or dirt on top of the water will drain off through the pipe 40. Water is also turned on to the spray pipe 42 which will spray other portions of the chassis with water so as to clean said portions and this spray water causes the water level to rise so that the oil and dirt at the top of the water will drain through the pipe 40. When the car is driven out of the pit, the level drops back below the discharge pipe. After the chassis has been washed, the car is thrown in forward speed and when this occurs, the roller 24 will be locked against rotary movement by the ratchet wheel 28 and dog 29 which will result in the locking of the other rollers so that the car can move out of the device and all the rollers will be held stationary.

The chamber 2 can be drained in any suitable manner.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:

In a motor vehicle washing device, a pit adapted to contain water, a set of transversely extending rollers in the pit adapted to support the rear wheels of the vehicle, a second set of transversely extending rollers in the pit adapted to support the front wheels of the vehicle, a ratchet wheel carried by one of the rollers of the first set and a dog engaging the ratchet for holding the roller against rotary movement in one direction but permitting the roller to revolve in an opposite direction, and means for transmitting movement of said roller to all the other rollers.

PARK C. BUTLER.